Figure 6:
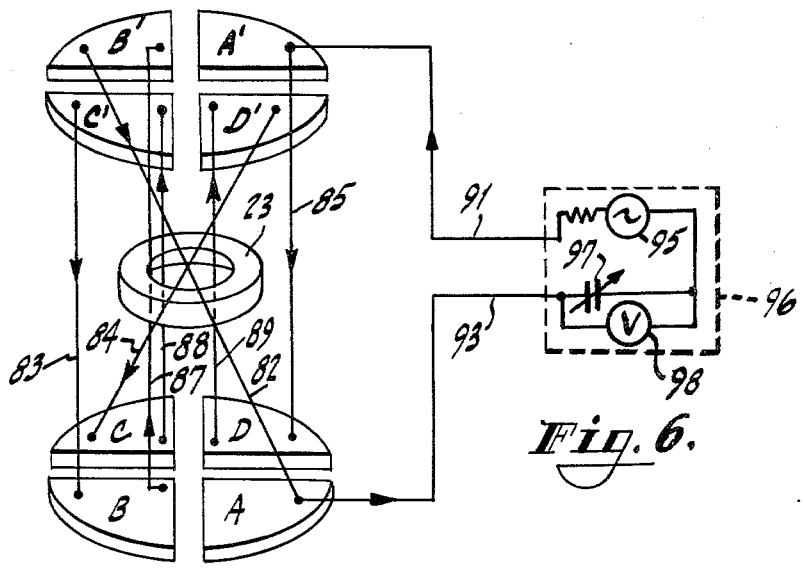

Jan. 11, 1966    D. A. KADISH    3,229,195
APPARATUS FOR TESTING MAGNETIC MATERIALS
Filed July 28, 1961    3 Sheets-Sheet 1
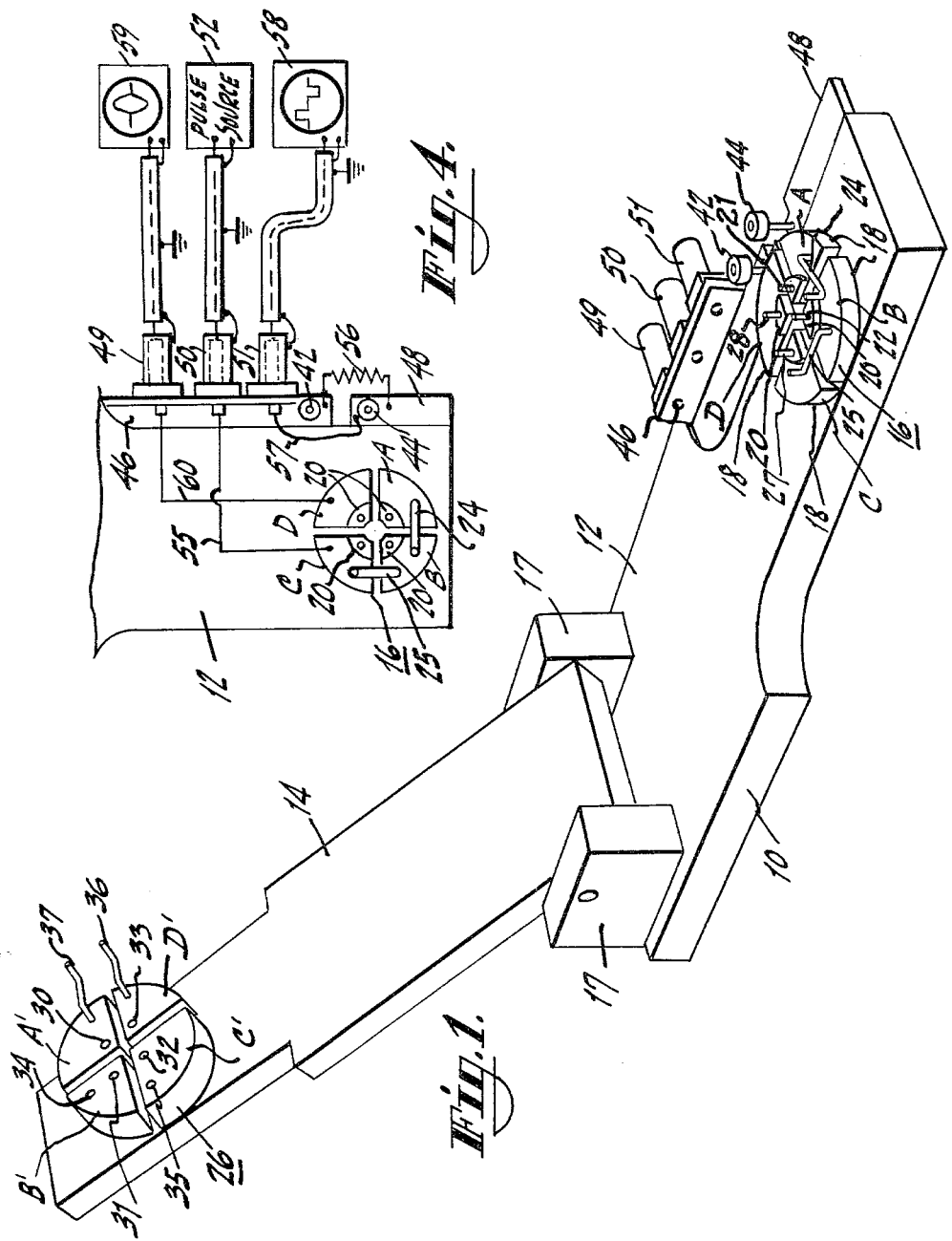
INVENTOR.
DONALD A. KADISH
BY
ATTORNEY

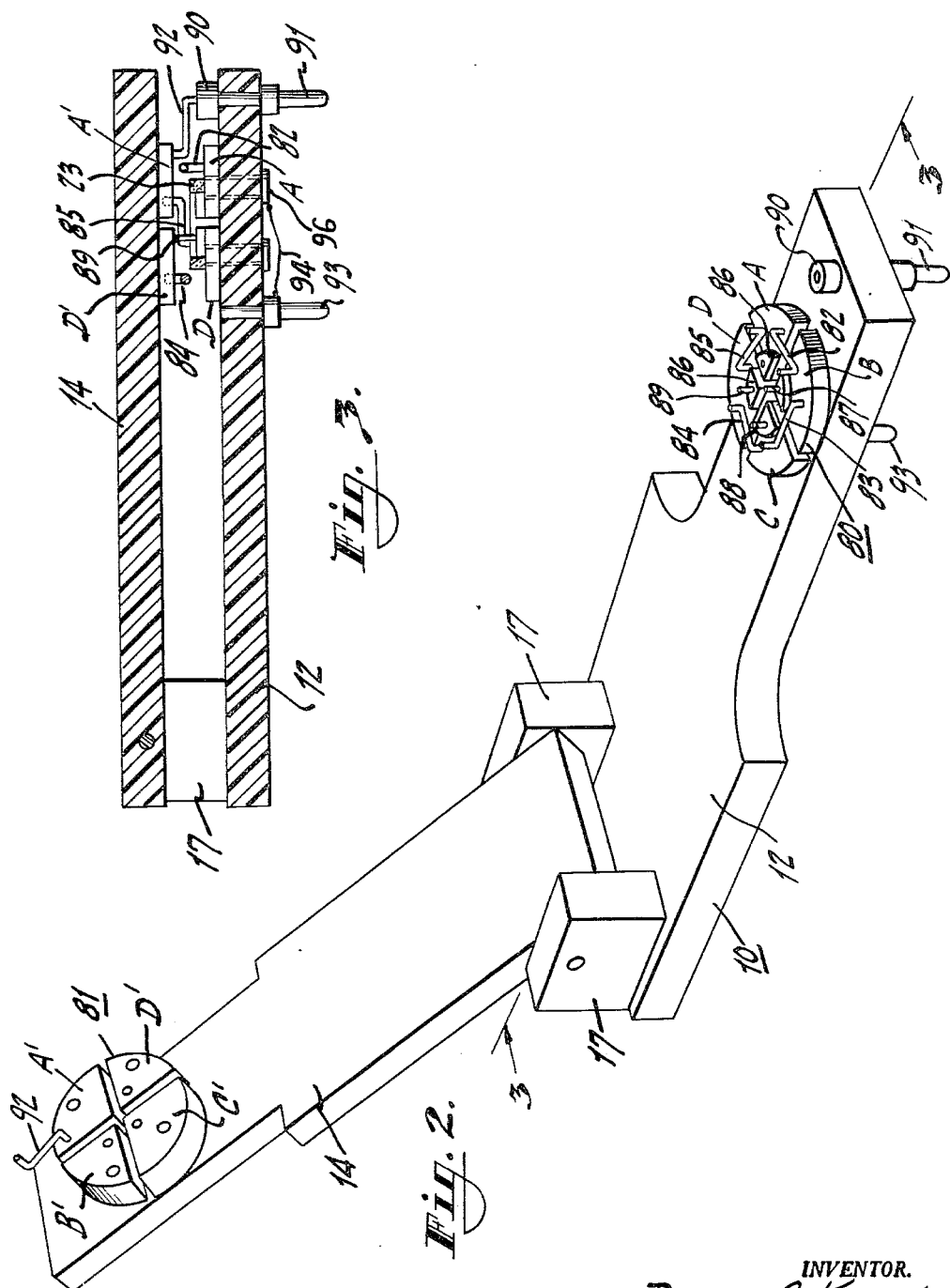

Jan. 11, 1966  D. A. KADISH  3,229,195
APPARATUS FOR TESTING MAGNETIC MATERIALS
Filed July 28, 1961  3 Sheets-Sheet 3

INVENTOR.
DONALD A. KADISH
BY
ATTORNEY

United States Patent Office 3,229,195
Patented Jan. 11, 1966

3,229,195
APPARATUS FOR TESTING MAGNETIC
MATERIALS
Donald A. Kadish, Watertown, Mass., assignor to Radio
Corporation of America, a corporation of Delaware
Filed July 28, 1961, Ser. No. 127,661
12 Claims. (Cl. 324—34)

This invention relates to apparatus for testing magnetic material, and more particularly to apparatus for determining the magnetic properties of magnetic cores. While not limited thereto, the present invention is especially useful in testing toroidal switch cores, often useful in data processing applications.

One of the preferred methods of testing the magnetic property of magnetic materials is to determine the hysteresis characteristic curves thereof. From such curves, magnetic material parameters such as coercive force, remanent and saturation induction, and initial and maximum permeability are derivable. The testing is usually accomplished by winding a core of the material to be tested with primary and secondary coils, the coupling between these coils caused by the core serving to provide the test data.

Most arrangements in the prior art for measuring the characteristics of toroidal magnetic cores make use of only a one turn primary coil and a one turn secondary coil. It is often not desirable to use a high frequency, sinusoidal, magnetic driving force upon the material being tested because of capacitance effects. Moreover, these capacitance effects vary from time to time when the tests are made with hand wound coils. It has been proposed to use pulsed magnetizing current to drive the material to be tested. However, when switch cores are to be tested, there still remains the problem of readily and quickly coupling tests coils of more than one turn thereto in order to obtain adequate output voltages suitable for test purposes, and with uniform capacities and inductances from test to test.

The primary object of the present invention is to provide improved apparatus for testing magnetic material for magnetic properties.

More particularly, it is an object of the present invention to provide improved magnetic core testing apparatus which makes it possible to couple to the core a multiple turn test coil without actually winding the coil around the core.

It is another object of this invention to provide improved magnetic core testing apparatus as aforesaid by means of which a multi-turn test coil can be coupled to cores in a facile and efficient manner without actually having to wind the coil on the cores.

Still another object of the present invention is to provide improved magnetic core testing apparatus having a multiple turn test coil of fixed geometry so that the constants of the coil, such as capacity between turns, capacity to ground, and inductance, remain fixed.

It is also an object of this invention to provide improved magnetic core testing apparatus as aforesaid in which close coupling can be attained between the multi-turn test coil and the cores to be tested.

It is a further object of this invention to provide improved magnetic core testing apparatus as above set forth which allows for easy loading of cores to test their magnetic properties.

It is still a further object of this invention to provide improved core testing apparatus as aforesaid which is simple in construction and economical to manufacture, and which allows for testing small cores in a simple, rapid, inexpensive and efficient manner.

According to one form of the invention, a testing apparatus is provided comprising a pair of pivotally connected arms made of insulating material. Each arm has a like number of conductive segments of a circular disk thereon, the segments being insulated from each other. The segments of the disk connected to one arm are formed with leads extending outwardly from the surface thereof. The segments of the disk connected to the other arm are formed with a number of holes for receiving the leads extending from the disk segments on the first arm when the arms are in a closed position. In order to test a core, the core is positioned on the disk formed with the leads so that some of the leads extend through the opening in the core and the remainder of the leads are positioned around the outer periphery of the core. The arms are then closed. Some of the segments from each disk are joined to form a sensing coil which can be connected to a voltage indicating device such as an oscilloscope. The other joined segments of the two disks form a primary winding with a plurality of turns. Means are provided to apply current pulses to the primary winding to produce voltages in the sensing winding.

Figure 5:
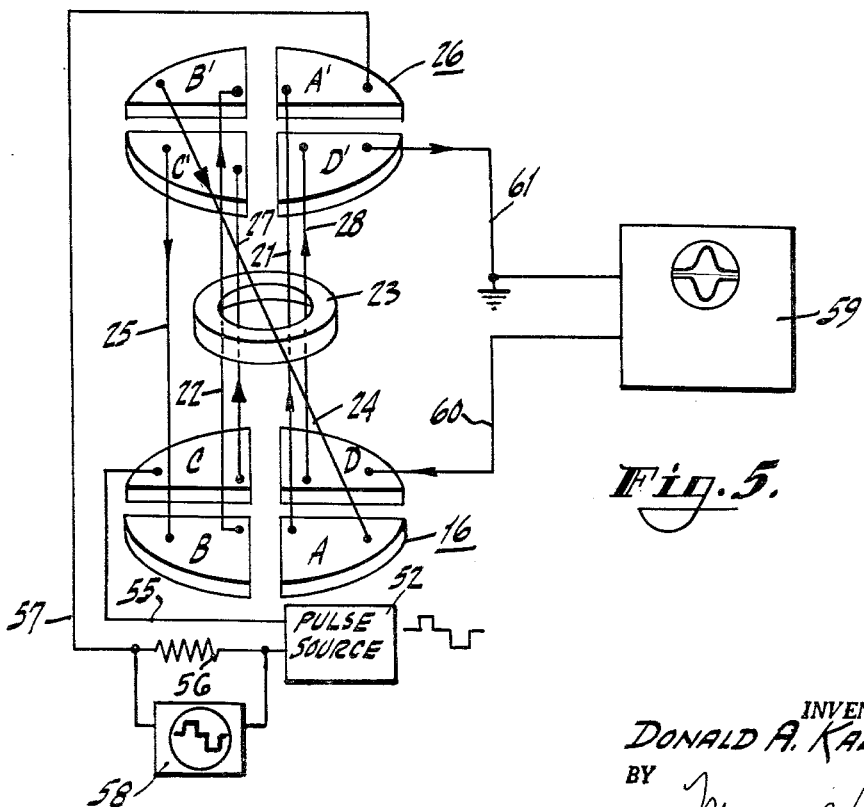

The novel features of this invention, both as to the organization and method of operation, as well as additional objects and advantages thereof, will be more fully understood from the following description, when read in connection with the accompanying drawings, in which:

FIG. 1 is a perspective view of one form of test apparatus according to this invention, the apparatus being shown with the arms in open position, FIG. 2 is a similar view of another embodiment of a test apparatus according to the invention, FIG. 3 is a central, longitudinal, sectional view of the test apparatus of FIG. 2 taken along the line 3—3 of FIG. 2 but shown with the arms in closed position, FIG. 4 is a view, partly diagrammatic and partly schematic, showing the manner in which the test apparatus of FIG. 1 may be connected to a source of energy and to wave indicating devices, FIG. 5 is a schematic diagram showing the connections between the segment members of the test apparatus illustrated in FIG. 1 and the coupling of the primary and secondary windings to a core to be tested, and also showing the primary winding connected to a source of current pulses and the pick-up or secondary winding connected to a measuring apparatus, and FIG. 6 is a similar schematic diagram showing the segment members of the test apparatus illustrated in FIG. 2 connected to a measuring instrument.

Referring, now, to FIGS. 1 and 4 of the drawings, a test apparatus 10 is illustrated which includes a pair of arms 12 and 14, the arm 12 being hereinafter referred to as a base for purposes of identification. Complementary, circular, segmental disks 16 and 26 of conductive material are connected to the base 12 and the arm 14, respectively. The base 12 and the arm 14 are formed of a suitable, rigid insulating material, such as "Bakelite," the arm 14 being pivoted between uprights 17 attached to the base 12 near one end thereof.

The circular, conductive disk 16, which is divided into a number of segments 18, is attached to the base 12 near the other end thereof. Each of the segments 18 is separated from its adjacent segments by a small air gap which acts an an insulator, thereby making each segment 18 an individual conducting member. By way of example, the disk 16 illustrated in FIG. 1 is divided into four equal quadrant segments A, B, C and D, but, as will become apparent from the description which follows, if one desires to increase the number of winding turns, the number of segments 18 into which the disk is divided can be increased. In any case, it will be appreciated that the segments A, B, C and D are disposed in a circular, endless array.

Extending perpendicularly to the surface of the disk 16 adjacent the apex of each of the segments A, B, C and D is a raised portion 20. A core 23, whose properties are to be measured, can be positioned around these raised portions 20. Leads 21, 22, 27 and 28 extend upwardly from the raised portions 20 of the segments A, B, C and D, respectively. Also extending upwardly from the segments A and B, respectively, are step-shaped leads 24 and 25 for a purpose presently to be set forth.

The circular disk 26, which is preferably of the same diameter as the disk 16, is connected to the arm 14 near its non-pivoted end. The disk 26 is divided into the same number of spaced segments A', B', C' and D' as the disk 16, so that each of the segments of the disk 16 is aligned with a complementary segment of the disk 26 when the arm 14 is closed on the base 12. Formed adjacent the apexes of the respective segments A', B', C' and D' are holes 30, 31, 32 and 33 for respectively receiving the leads 21, 22, 27 and 28 projecting from the segments of the disk 16 when the arm 14 is closed on the base 12. Holes 34 and 35 are formed in the surface of the respective segments B' and C' near the peripheries thereof for receiving the free ends of the step-shaped leads 24 and 25, respectively. Extending outwardly and downwardly from the respective segments D' and A' (when the arm 14 is lowered) are conductive leads 36 and 37 which are adapted, respectively, to make contact with socket contacts 42 and 44 shortly to be referred to more particularly.

When a toroidal core 23 is to be tested, it is placed on the disk 16 around the raised portions 20 and the arm 14 is brought down in closed position over the base 12. The leads 21, 22, 27 and 28 are then received in the holes 30, 31, 32 and 33, respectively, and the leads 24 and 25 are received in the holes 34 and 35, respectively. At the same time, the leads 36 and 37 are received in the contacts 42 and 44. There is thus established, in the embodiment of FIG. 1, a three-turn primary winding and a single turn secondary winding around the core. Starting with the segment C, the first turn of the primary winding, which is connected to an energizing source identified more particularly hereinafter, continues through the core 23 along the lead 27 to the segment C' and thence along the lead 25 to the segment B. The second turn of the primary winding goes from the segment B through the core 23 along the lead 22 to the segment B' and thence along the lead 24 to the segment A. The third turn of the primary winding goes from the segment A through the core 23 along the lead 21 to the segment A' and thence back to the energizing source. The single turn secondary winding is established from the segment D via the lead 28, which passes through the core 23, to the segment D', the segments D and D' being connected to a suitable measuring or indicating instrument as pointed out more particularly hereinafter. The foregoing is clearly illustrated in FIG. 5.

Attached to one side of the base 12 are two conductive plates 46 and 48 which are spaced and insulated from each other. Extending upwardly from and connected electrically to the plates 46 and 48 are the socket contacts 42 and 44, respectively. These contacts have openings in the upper ends thereof for receiving the leads 36 and 37.

The plate 46 has a vertically extending wall to which three coaxial terminal connectors 49, 50 and 51 are attached. The shells or outer conductors of the connectors 49, 50 and 51 are mounted on the vertical wall of the plate 46 and are commonly grounded thereby. The center or inner conductors of the connectors 49, 50 and 51 are insulated from their respective outer conductors in known manner. The inner conductor of the connector 49 is connected by a lead 60 to the segment D, and the inner conductor of the connector 50 is similarly connected by a lead 55 to the segment C. The inner conductor of the connector 51 is connected by a lead 57 to the plate 48.

To operate the apparatus 10, a suitable source 52 of square wave or substantially square wave current pulses is connected by a coaxial line to the connector 50, and a suitable measuring device, such as an oscilloscope 59, has its vertical deflection circuit connected by a coaxial line to the connector 49. The current pulse source 52 is connected by the lead 55 to the segment C of the disk 16 and by a resistor 56 and the conductor 57 (via the contact 44 and the lead 37) to the segment A' of the disk 26. The actual current flowing through the primary winding may be measured by connecting the horizontal deflection circuit of an oscilloscope 58 across the resistor 56. The measuring oscilloscope 59 is connected to the segment D of the secondary or pick up winding by the lead 60 and to the segment D' by means of a grounded lead 61 via the contact 42 and the lead 36. The wave shape induced in the pick up coil by each wave of current may be observed on the oscilloscope 59. The variations in wave shapes are dependent on the characteristics of the particular core being tested. A wave shape typical of the results obtained is shown on the face of the oscilloscope 59 in FIGS. 4 and 5.

The testing apparatus described thus far is particularly useful for testing cores used as switch cores in switching matrices. In order to explain the operation of this form of testing apparatus, assume that a toroidal core 23 is positioned on the disk 16 around the raised portions 20 with the leads 21, 22, 27 and 28 extending through the center opening in the core and leads 24 and 25 extending upwardly adjacent the outer periphery of the core 23. The arm 14 is then closed so that the leads extending upwardly from disk 16 will be received in their complementary holes in disk 26. Current pulses from the source 52 are then applied to the primary winding. Current pulses of one polarity will flow through lead 55, segment C, lead 27, segment C' and lead 25, thereby completing one turn on the coil. These pulses then continue through segment B, lead 22, segment B', lead 24, and segment A, thereby completing a second turn around the core 23. The same pulses then flow through segment A, lead 21, segment A', lead 57 and resistor 56 back to the pulse source. Current pulses of the opposite polarity will, of course, pass along the same path but in the opposite direction. Current pulses thus applied to the multiple turn primary winding will induce in the single turn pick up coil a signal of relatively large amplitude which can be applied to the vertical input terminals of the oscilloscope 59 through the leads 60 and 61 connected to segments D and D', respectively. The trace appearing on the face of the screen of the oscilloscope 59 is indicative of the $\phi$–NI characteristics of the core under test.

Referring, now, to FIGS. 2, 3 and 6 of the drawing, a second embodiment of the present invention is illustrated which is capable of placing a single four-turn winding on a core for determining the permeability and Q of the material of the core.

A pair of disks 80 and 81, which are similar in size and form to disks 16 and 26 and are divided into a number of segments, are connected to the base 12 and arm 14, respectively. The disk 80 is provided with step-shaped leads 82, 83, 84 and 85 projecting upwardly from the segments A, B, C and D, respectively. Formed adjacent to the apex of each of the segments is a raised portion 86 around which a core 23 to be measured can be positioned. Leads 87, 88 and 89 extend upwardly from the top, raised portions of the segments B, C and D.

Formed near the apexes of the respective segments B', C' and D' of the disk 81 are openings for receiving the leads 87, 88 and 89. In each of the segments A', B', C' and D', adjacent the peripheries thereof, is an opening for receiving one of the step-shaped leads 82, 83, 84 and 85. The lead 82, which is connected to the segment A, is positioned so that it extends into the peripheral hole in the segment B' when the arm 14 is closed on the base 12. In a similar manner, the lead 83 connected to the segment B projects into the peripheral opening in the segment C', and the lead 84 connected to segment C projects into the peripheral opening in the segment D'. Lastly, the lead 85 connected to the segment D projects into the peripheral opening in the segment A'. Connected to the segment A' and extending outwardly is a lead 92 which extends down into a socket contact 90 when the arm 14 is closed on the base 12. The contact 90 is connected to a terminal 91 on the arm 12. A second terminal 93 on the arm 12 is connected to the segment A by means of a lead 94 connected to a screw 96 threaded into the segment A.

In order to measure the properties of a particular core 23, the core is positioned on the disk 80 with the center leads 87, 88 and 89 projecting upwardly through the center opening in the core 23. The leads 82, 83, 84 and 85 are positioned around the outer periphery of the core 23. The arm 14 is then closed so that the leads 82, 83, 84 and 85 will be positioned in their respective complementary holes in disk 81. A source of A.C. sine wave current, such as an oscillator 95 incorporated in a Q meter 96, for example, is connected in series with the four-turn winding around the core 23 through a tuning capacitor 97, also incorporated in the Q meter, and the terminals 91 and 93. The path of the sine wave current applied to the winding can be traced, in one direction, from the oscillator 95 to the terminal 91, the contact 90, the lead 92, the lead 85, the segment A', the lead 89, the segment D', the lead 84, the segment D, the lead 88, the segment C', the lead 83, the segment C, the lead 87, the segment B', the lead 82, the segment B, the lead 94, the terminal 93, the capacitor 97, and finally back to the oscillator 95. By tuning the capacitor 97 to resonance with the winding at the operating frequency, the voltmeter 98 connected across this capacitor can be read as an indication of the change in capacitance of the capacitor 97 necessary to provide the indicated resonance as compared to the capacitance thereof when the core under test is not in place on the test apparatus.

From the foregoing description, it will be apparent that I have provided an improved testing apparatus for easily and quickly testing properties of magnetic cores, for example, such cores as transfluxor cores, switch cores, and others. While I have illustrated and described two particular forms of testing apparatus, it will, no doubt, be apparent to those skilled in the art that various changes may be made in the forms described, and that other forms are possible all within the spirit of the present invention. It will also be apparent that apparatus embodying the present invention can be employed for testing cores other than toroidal cores. Since the invention may be embodied in various forms, I desire that the foregoing shall be taken merely as illustrative and not in a limiting sense.

I claim as my invention:

1. Apparatus for testing cores comprising a pair of relatively movable members of insulating material movable to open and closed relations, said members each having a plurality of conductive elements thereon in insulated relation to each other, said conductive elements on one of said members being adapted to support thereon a core to be tested, said conductive elements on both said members cooperating to confine said core between them when said members are in said closed relation, and conductive means interconnecting said elements on said one member with said elements on the other of said members when said members are in said closed relation to provide a multiplicity of winding turns around said core.

2. Apparatus for testing cores comprising a pair of relatively movable members of insulating material movable to open and closed relations, said members each having a group of conductive elements thereon in insulated relation to each other, one said group of elements having means for positioning thereon a core to be tested, said groups of elements being disposed on their respective said members to be brought into cooperative relation with each other and to confine said core therebetween when said members are in said closed relation, and conductive means on said elements interconnecting those of said elements on one of said members with those of said elements on the other of said members when said members are closed to provide a multiplicity of winding turns around said core.

3. Apparatus for testing toroidal cores comprising a pair of relatively movable members of insulating material movable to open and closed relations, said members each having a group of conductive elements thereon disposed in closely spaced relation to each other in an endless array along a closed path about a common center and insulated from each other, said elements of one of said groups of elements each having a raised portion adjacent said center about which a core to be tested can be threaded, said groups of elements being further disposed on their respective said members to be brought into cooperative relation with each other to confine said threaded core therebetween when said members are in said closed relation, and conductive means on said elements interconnecting those of said conductive elements on one of said members with those of said conductive elements on the other of said members when said members are closed to provide a multiplicity of winding turns around said core.

4. Apparatus for testing toroidal cores comprising a pair of relatively movable members of insulating material movable to open and closed relations, said members each having a group of conductive elements thereon disposed in closely spaced relation to each other in an endless array along a closed path about a common center and insulated from each other, said elements of one of said groups of elements each having a raised portion adjacent said center about which a core to be tested can be threaded, said groups of elements being further disposed on their respective said members to be brought into cooperative relation with each other to confine said threaded core therebetween when said members are in said closed relation, and conductive means on said elements interconnecting those of said conductive elements on one of said members with those of said conductive elements on the other of said members when said members are closed to provide a multiplicity of winding turns around said core, certain of said conductive means comprising leads mounted on at least certain of said raised portions and constituting portions of said winding within the hole of said toroidal core, and certain other of said conductive means comprising leads mounted on at least certain of said elements adjacent the peripheries thereof and constituting portions of said winding outside of the outer periphery of said toroidal core.

5. Apparatus for testing toroidal cores comprising a pair of relatively movable members of insulating material movable to open and closed relations, said members each having a group of conductive elements thereon disposed in closely spaced relation to each other in an endless array along a closed path about a common center and insulated from each other, said elements of one of said groups of elements each having a raised portion adjacent said center about which a core to be tested can be threaded, said groups of elements being further disposed on their respective said members to be brought into cooperative relation with each other to confine said threaded core therebetween when said members are in said closed relation, and conductive means on said elements interconnecting those of said conductive elements on one of said members with those of said conductive elements on the other of said members when said members are closed, certain of said conductive means being arranged to connect certain of said conductive elements of said groups to provide a multiplicity of primary winding turns around said core, and one of said conductive means being disposed to connect one of said elements of one of said groups to one of said elements of the other of said groups to provide a single turn secondary winding around said core.

6. Apparatus for testing cores comprising a pair of arms of insulating material pivotally connected to each other for movement to and from a closed position, and conducting means mounted on each said arm and adapted to hold between them when said arms are in said closed position a core supported on at least certain of said conducting means, said conducting means including means for embracing said core to form a winding with a plurality of conductor turns around said core when said arms are in said closed position.

7. Apparatus for testing cores comprising a pair of arms of insulating material pivotally connected to each other for movement to and from a closed position, a plurality of conducting means mounted on each of said arms in insulated relation to each other and adapted to hold between them when said arms are in said closed position a core supported on said conducting means on one of said arms, said conducting means forming a single winding with a plurality of conductor turns around said core when said arms are in said closed position, and means for applying a source of voltage to the ends of said winding.

8. Apparatus for testing cores comprising a pair of arms of insulating material pivotally connected to each other for movement to and from a closed position, a plurality of conducting members mounted on each of said arms in insulated relation to each other, said conducting members on one of said arms having leads protruding from said members' surfaces, said conducting members on the other of said arms having holes for receiving said leads when said arms are in said closed position, said leads being so positioned that said leads and conductor members form a winding with a plurality of conductor turns around a core to be tested, and means for applying a source of voltage to the ends of said winding.

9. Apparatus for testing cores comprising a pair of arms of insulating material pivotally connected to each other for movement to and from a closed position, a pair of complementary disks of conductive material, one disk being mounted on one of said arms and the other on the other of said arms, each said disk being formed of a plurality of separate segments insulated from each other, one of said disks being adapted to support thereon a core to be tested, and said disks being adapted to receive said core therebetween when said arms are in said closed position, conductive leads extending from each of said segments on one of said arms, said segments on the other of said arms having cavities therein complementary to said leads, said conductive leads being positioned in their complementary cavities when said arms are in said closed position, said segments and leads jointly forming a plurality of conductor turns as a single coil about said core when said arms are in said closed position, and means for applying a voltage to said coil.

10. Apparatus for testing cores comprising a pair of arms of insulating material pivotally connected to each other for movement to and from a closed position, a plurality of conducting means mounted on each of said arms, said conducting means on one of said arms being adapted to support a core to be tested, and said conducting means on both of said arms being adapted to cooperate to hold a core therebetween when said arms are in said closed position, and means interconnecting said conducting means to provide a pair of windings when said arms are in said closed position, certain of said conducting means on each of said arms and said interconnecting means therebetween forming an actuating winding of a plurality of turns when said arms are in said closed position and certain other of said conducting means on each of said arms and said interconnecting means therebetween forming a pickup winding when said arms are in said closed position.

11. Apparatus for testing cores comprising a pair of arms of insulating material pivotally connected to each other for movement to and from a closed position, a plurality of conducting means mounted on each of said arms, said conducting means on one of said arms being adapted to support a core to be tested, and said conducting means on both of said arms being adapted to cooperate to hold a core therebetween when said arms are in said closed position, means interconnecting said conducting means to provide a pair of windings when said arms are in said closed position, certain of said conducting means on each of said arms and said interconnecting means therebetween forming an actuating winding of a plurality of turns when said arms are in said closed position, certain other of said conducting means on each of said arms and said interconnecting means therebetween forming a pickup coil when said arms are in said closed position, means for applying a source of voltage across said actuating coil, and means for connecting a measuring device to said pickup coil.

12. Apparatus for testing cores comprising a pair of arm of insulating material pivotally connected to each other for movement to and from a closed position, a pair of complementary disks, one of said disks being mounted on one of said arms and being adapted to support a core to be tested, and the other of said disks being mounted on the other of said arms, each said disk being formed of a plurality of separate segments insulated from each other, conductive leads extending from each of said segments on one of said arms, said segments on the other of said arms having cavities therein complementary to said leads, said conductive leads being positioned in their complementary cavities when said arms are in said closed position to thereby connect said segments, certain of said connected segments forming an actuating winding of a plurality of turns, one pair of said connected segments forming a pickup winding, means for applying a source of voltage across said actuating winding, and means for connecting a measuring device to said pickup winding for indicating certain properties of said core.

References Cited by the Examiner
UNITED STATES PATENTS 2,970,255  1/1961  Coffin et al. _____ 324—34
2,970,690  2/1961  Werner _____ 324—34 X RICHARD B. WILKINSON, *Primary Examiner.*